No. 787,738. PATENTED APR. 18, 1905.
A. C. EASTWOOD.
MOTOR STARTING DEVICE.
APPLICATION FILED SEPT. 9, 1904.
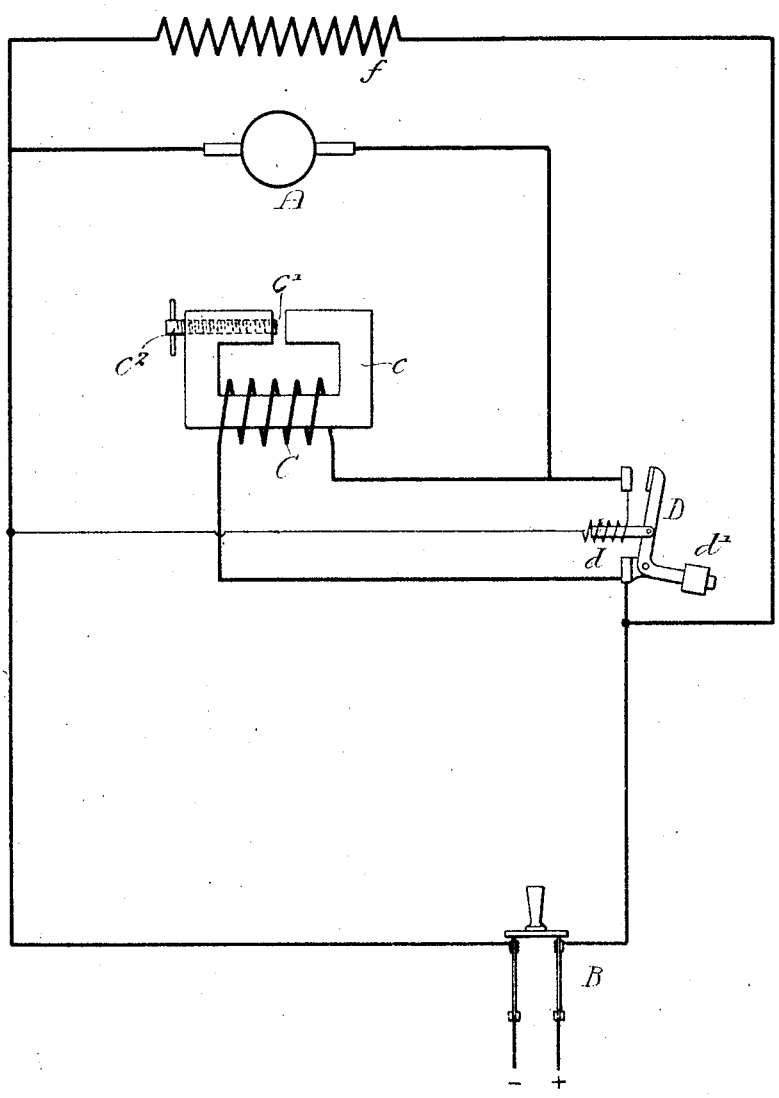
Witnesses:
Augustus B. Copps
Wesley H. Reel
Inventor:
Arthur C. Eastwood,
by his Attorneys,
Howson & Howson No. 787,738.                                    Patented April 18, 1905.

UNITED STATES PATENT OFFICE.

ARTHUR C. EASTWOOD, OF CLEVELAND, OHIO.

MOTOR-STARTING DEVICE.

SPECIFICATION forming part of Letters Patent No. 787,738, dated April 18, 1905.

Application filed September 9, 1904. Serial No. 223,357.

*To all whom it may concern:*

Be it known that I, ARTHUR C. EASTWOOD, a citizen of the United States, residing in Cleveland, Ohio, have invented certain Improvements in Motor-Starting Devices, of which the following is a specification.

One object of my invention is to provide a motor-starting device of relatively simple construction and operation which shall require merely the closing of a switch to safely start the motor with which it is in circuit.

Another object of the invention is to provide motor-starting means which will at all times automatically act to protect the motor, particularly in the event of the cutting off of the current from it and the subsequent reëstablishment of the current-supply, it being desired that the device shall operate to automatically start the motor upon such restoration of the current-flow.

These objects I attain as hereinafter set forth, reference being had to the drawing, in which the figure is a diagrammatic view illustrating the connections of my improved device to a motor and to a source of current.

With motor-starting devices as at present known and used in the art it is necessary after each failure or cutting off of the current-supply to manually start each motor, and when there are a number of widely-scattered motors, such as are frequently used in driving pumps for oil-wells, this starting of each motor by means of its starting-rheostat involves a considerable amount of annoyance and expense, together with loss of time and output.

My invention consists in providing a winding of relatively high self-induction in series with each motor, together with a switch connected to automatically cut out said winding after the motor is started, said switch being preferably of such a nature that it automatically opens upon the cessation of current-flow.

In the above drawing, A is the armature of the motor, which in the present instance is of the shunt-wound type, having a field-winding $f$ connected to the terminals of a main current-controlling switch B. A winding C upon a core $c$ of magnetic material, such as soft iron, has one terminal connected to the armature of the motor and the other to one of the terminals of the main switch B. In the present instance the core $c$ is of the shape of a hollow rectangle, having an air-gap $c'$ in its magnetic circuit which may be varied, if desired, by means of an adjustable piece of metal $c^2$, so as to vary the reluctance of said circuit.

In shunt to the winding C is an electromagnetic switch D, which when its coil $d$ is insufficiently excited is maintained in an open position by means of a weight $d'$ or any other desired equivalent means. One end of said coil $d$ is connected to that terminal of the switch D which is permanently connected to one end of the armature, while its second end is permanently connected to the second armature-terminal.

Under operating conditions as soon as the main switch B is closed the field $f$ is excited and current flows to the armature A through the coil $c$. Owing, however, to the self-induction of the winding $c$ an electromotive force is generated in the winding which opposes the applied electromotive force, thereby serving to cut down the initial flow of current to the motor. As the armature begins to revolve its counter electromotive force gradually increases, while the electromotive force set up in the winding $c$ gradually decreases, so that by suitable adjustment of the inductance of said coil the motor may be made to start smoothly and with a safe current-flow. The coil $d$ is so wound that when the counter electromotive force of the armature reaches a predetermined point it actuates the armature of the switch D, closing the same, thereby short-circuiting the inductive winding C. I prefer to thus cut out the coil $c$ because under operating conditions it will usually consist of a relatively large number of turns, and it is evident that said coil can be built much more cheaply if it be designed to be only temporarily in circuit, as during the period of starting the motor. It is also desirable to have this inductive winding normally out of circuit by reason of the fact that when it is used with a motor of considerable size on a high-voltage circuit a relatively high inductive voltage otherwise results when the motor-circuit is opened. This objectionable feature is overcome by short-circuiting the winding, since after the motor has been started there is no flow of current through it, and consequently no magnetic flow in the circuit of the core $c$, and hence no inductive discharge when the switch B is opened to stop the motor. It will be seen that upon the failure of the current supplied through the main switch B the switch D will automatically open, thus again inserting the inductive winding C in circuit with the armature. If now the flow of current is again resumed, the apparatus operates as above described, the motor thus being always protected from abnormal flow of current.

I claim as my invention—

1. The combination of a direct-current motor, a body of inductive starting resistance in addition to the motor-windings, in circuit with said motor, with means dependent for its action on the counter electromotive force of the motor for automatically cutting said starting resistance out of circuit when said counter electromotive force rises to a predetermined point, substantially as described.

2. The combination of a direct-current motor having in series with it a body of inductive starting resistance in addition to its field-windings, and an automatic switch in shunt to said starting resistance, substantially as described.

3. The combination of a motor having in its circuit a body of inductive starting resistance in addition to its own windings, and an electromagnetic switch in shunt to said starting resistance.

4. The combination of a motor, a body of inductive starting resistance in addition to said motor-windings, in circuit with said motor, with an electromagnetic switch placed to cut out said starting resistance and having an actuating-coil connected to cause its operation after the counter electromotive force of the armature reaches a predetermined point, substantially as described.

5. The combination of a motor having in series with it an inductive starting resistance in addition to its own field-windings, a switch provided with means tending to maintain it in an open condition, said switch being in shunt to said starting resistance, with a coil for operating said switch, said coil having its ends connected respectively to the armature-terminals of the motor, substantially as described.

6. The combination of a motor, a body of inductive starting resistance in circuit therewith, means for varying the inductance of the winding comprising said resistance and a switch depending for its action on the counter electromotive force of the motor for cutting said body of starting resistance into and out of circuit, substantially as described.

7. The combination of a motor, with a body of starting resistance, a body of magnetic material adjacent to said starting resistance and forming a magnetic circuit therefor, means for adjusting the reluctance of said magnetic circuit, and an automatic switch for cutting said starting resistance into and out of circuit with the motor, substantially as described.

In testimony whereof I have signed my name to this specification in the presence of two subscribing witnesses.

ARTHUR C. EASTWOOD.

Witnesses:
 WALTER J. HAMILTON,
 E. M. FRANCE.